US012718766B2

(12) United States Patent
Kim et al.

(10) Patent No.: US 12,718,766 B2
(45) Date of Patent: Aug. 25, 2026

(54) GATE DRIVER WITH SIGNAL LINE LAYOUT MINIMIZING PARASITIC CAPACITANCE AND DISPLAY DEVICE INCLUDING THE SAME

(71) Applicant: Samsung Display Co., Ltd., Yongin-si (KR)

(72) Inventors: Eok Su Kim, Yongin-si (KR); Jong Do Keum, Yongin-si (KR); Hyung Jun Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 112 days.

(21) Appl. No.: 18/598,522

(22) Filed: Mar. 7, 2024

(65) Prior Publication Data

US 2025/0078767 A1 Mar. 6, 2025

(30) Foreign Application Priority Data

Aug. 30, 2023 (KR) ........................ 10-2023-0114912

(51) Int. Cl.
*G09G 3/3266* (2016.01)
*G09G 3/36* (2006.01)

(52) U.S. Cl.
CPC ......... *G09G 3/3266* (2013.01); *G09G 3/3677* (2013.01); *G09G 2300/0426* (2013.01); *G09G 2310/08* (2013.01)

(58) Field of Classification Search
CPC ............... G09G 3/3266; G09G 3/3677; G09G 2300/0426; G09G 2310/08
USPC ............................................................ 345/55
See application file for complete search history.

(56) References Cited

U.S. PATENT DOCUMENTS

| | | | | |
|---|---|---|---|---|
| 8,564,515 | B2 | 10/2013 | Kwak et al. | |
| 8,736,596 | B2 | 5/2014 | Joo et al. | |
| 9,202,827 | B2 | 12/2015 | Koyama et al. | |
| 10,319,284 | B2 | 6/2019 | So et al. | |
| 2010/0033455 | A1* | 2/2010 | Kwak | G09G 3/3677 345/204 |
| 2013/0038587 | A1 | 2/2013 | Song et al. | |
| 2016/0293270 | A1* | 10/2016 | Jin | G11C 19/287 |
| 2017/0358267 | A1* | 12/2017 | Feng | G09G 3/3677 |
| 2021/0225879 | A1* | 7/2021 | Asai | H10D 86/60 |
| 2024/0134238 | A1* | 4/2024 | Nakagawa | H10D 86/60 |

FOREIGN PATENT DOCUMENTS

| | | | |
|---|---|---|---|
| KR | 10-1217079 | B1 | 12/2012 |
| KR | 10-1543280 | B1 | 8/2015 |
| KR | 10-1863332 | B1 | 6/2018 |
| KR | 10-2507421 | B1 | 3/2023 |

* cited by examiner

*Primary Examiner* — Mark Edwards
(74) *Attorney, Agent, or Firm* — Innovation Counsel LLP

(57) ABSTRACT

A gate driver according to embodiments of the present inventive concept includes a plurality of stages arranged in a first direction to output scan signals, clock signal lines supplying clock signals to the stages, power source signal lines supplying power sources to the stages, a start signal line that does not intersect the clock signal lines and the power source signal lines and supplies a start signal to a first stage among the stages, and an end signal line that does not intersect the clock signal lines, the power source signal lines, and the start signal line and supplies an end signal to a last stage among the stages.

18 Claims, 8 Drawing Sheets

1303: 1303a, 1303b
1304: 1304a, 1304b
1305: 1305a, 1305b
1306: 1306a, 1306b

1301: 1301a, 1301b
1302: 1302a, 1302b
1303: 1303a, 1303b
1304: 1304a, 1304b
1305: 1305a, 1305b
1306: 1306a, 1306b

GATE DRIVER WITH SIGNAL LINE LAYOUT MINIMIZING PARASITIC CAPACITANCE AND DISPLAY DEVICE INCLUDING THE SAME

CROSS-REFERENCE TO RELATED APPLICATION

The application claims priority to and the benefit of Korean Patent Application No. 10-2023-0114912, filed on Aug. 30, 2023, which is hereby incorporated by reference for all purposes as if fully set forth herein.

BACKGROUND

1. Field

The present inventive concept relates to a gate driver and a display device including the same.

2. Discussion

As information technology develops, the importance of a display device as a connection medium between a user and information is being emphasized. In response to this, the use of display devices such as a liquid crystal display device and an organic light emitting display device is increasing.

A display device includes a data driver for driving data lines, a gate driver for driving scan lines, and pixels connected to the scan lines and the data lines.

The gate driver may include a plurality of stages that are dependently connected to each other. Each of the stages may be connected to a corresponding scan line to supply a scan signal. To this end, the display device may include a plurality of signal lines that provide various signals to the plurality of stages.

Since the signal lines must be electrically connected to the plurality of stages, the signal lines may be crossed so as to be insulated from each other. In this case, parasitic capacitance may be generated where the signal lines intersect each other. This parasitic capacitance may cause distortion such as signal delay and signal interference.

SUMMARY

An object of the present inventive concept is to provide a gate driver capable of minimizing parasitic capacitance between signal lines connected to stages and a display device including the same.

Another object of the present inventive concept is to provide a gate driver capable of minimizing ripple in the last stage and a display device including the same.

A gate driver according to embodiments of the present inventive concept may include a plurality of stages arranged in a first direction to output a plurality of scan signals; clock signal lines supplying a plurality of clock signals to the plurality of stages; power source signal lines supplying power sources to the plurality of stages; a start signal line supplying a start signal to a first stage among the plurality of stages; and an end signal line supplying an end signal to a last stage among the plurality of stages. The start signal line may not overlap the end signal line, the clock signal lines and the power source signal lines in a plan view, and the end signal line may not overlap the start signal line, the clock signal lines and the power source signal lines in a plan view.

According to an embodiment, when the start signal is supplied to the start signal line, the end signal may be supplied to the end signal line.

According to an embodiment, the end signal may be further supplied after a scan signal is supplied to the last stage.

According to an embodiment, the clock signal lines and the power source signal lines may be disposed between the start signal line and the end signal line in a second direction different from the first direction.

According to an embodiment, the first direction may be a direction connecting upper and lower sides of the gate driver, and the second direction may be a direction connecting left and right sides of the gate driver.

According to an embodiment, the first stage may be disposed on the upper side of the gate driver and the last stage may be disposed on the lower side of the gate driver, and the start signal line may be disposed closest to the plurality of stages in the second direction and the end signal line may be disposed furthest from the plurality of stages in the second direction.

According to an embodiment, each of the plurality of stages may have a first input terminal connected to the start signal line or a carry signal line of a previous stage and a second input terminal connected to the end signal line or a carry signal line of a next stage, and the first input terminal may be located above the second input terminal in each of the stages.

According to an embodiment, the first stage may be disposed on the lower side of the gate driver and the last stage may be disposed on the upper side of the gate driver, and the start signal line may be disposed furthest from the plurality of stages in the second direction and the end signal line may be disposed closest to the plurality of stages in the second direction.

According to an embodiment, each of the plurality of stages may have a first input terminal connected to the start signal line or a carry signal line of a previous stage and a second input terminal connected to the end signal line or a carry signal line of a next stage, and the first input terminal may be located below the second input terminal in each of the stages.

According to an embodiment, each of the clock signal lines and the power source signal lines may include a first metal layer extending in the first direction and a second metal layer extending in the second direction and the second metal layer is located in a different layer from the first metal layer.

According to an embodiment, the start signal line and the end signal line may be formed of the first metal layer.

According to an embodiment, the start signal line and the end signal line may be formed of the second metal layer.

A display device according to embodiments of the present inventive concept may include a pixel unit including pixels connected to scan lines and data lines; a data driver supplying data signals to the data lines; and a gate driver including stages outputting scan signals to the scan lines, and signal lines connected to the stages. The signal lines may include clock signal lines supplying clock signals to the stages; power source signal lines supplying power sources to the stages; a start signal line supplying a start signal to a first stage among the stages; and an end signal line supplying an end signal to a last stage among the stages. The start signal line may not overlap the end signal line, the clock signal lines and the power source signal lines in a plan view, and the end signal line may not overlap the start signal line, the clock signal lines and the power source signal lines in a plan view.

According to an embodiment, when the start signal is supplied to the start signal line, the end signal may be supplied to the end signal line.

According to an embodiment, the end signal may be further supplied to the end signal line after a scan signal is supplied to the last stage.

According to an embodiment, the clock signal lines and the power source signal lines may be disposed between the start signal line and the end signal line.

According to an embodiment, the first stage may be disposed on the upper side of the pixel unit and the last stage may be disposed on the lower side of the pixel unit and the start signal line may be disposed closest to the stages and the end signal line may be disposed furthest from the stages.

According to an embodiment, each of the stages may have a first input terminal connected to the start signal line or a carry signal line of a previous stage and a second input terminal connected to the end signal line or a carry signal line of a next stage, and the first input terminal may be located above the second input terminal in each of the stages.

According to an embodiment, the first stage may be disposed on the lower side of the pixel unit and the last stage may be disposed on the upper side of the pixel unit, and the start signal line may be disposed furthest from the stages and the end signal line may be disposed closest to the stages.

According to an embodiment, each of the stages may have a first input terminal connected to the start signal line or a carry signal line of a previous stage and a second input terminal connected to the end signal line or a carry signal line of a next stage, and the first input terminal may be located below the second input terminal in each of the stages.

Objects of the present inventive concept are not limited to the objects mentioned above, and other technical objects not mentioned will be clearly understood by those skilled in the art from the description below.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
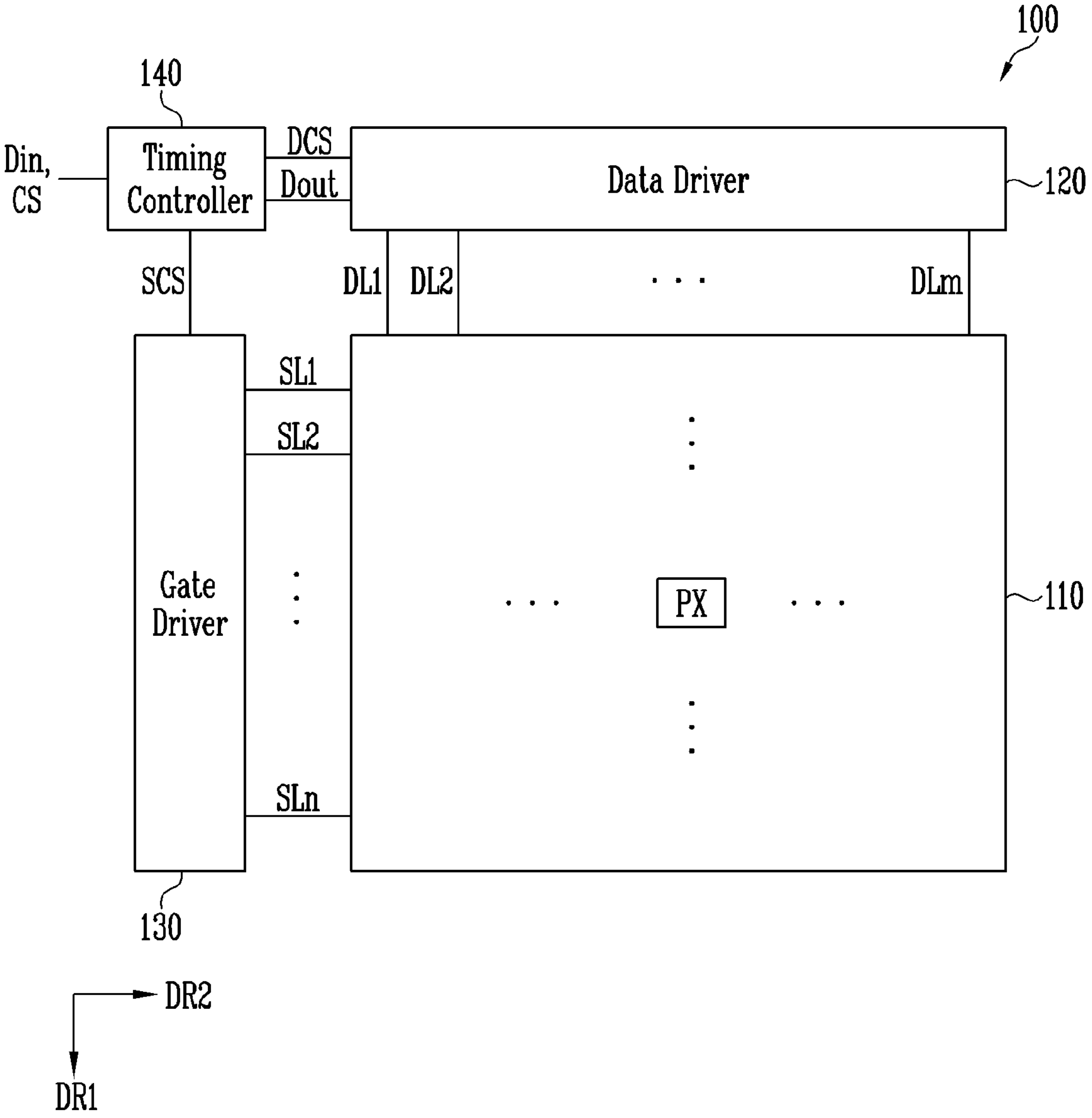
FIG. 1 is a diagram illustrating a display device according to an embodiment of the present inventive concept.

Hereinafter, various embodiments of the present inventive concept will be described in detail with reference to the accompanying drawings so that those of ordinary skill in the art may easily implement the present inventive concept. The present inventive concept may be embodied in various different forms and is not limited to the embodiments described herein.

In order to clearly describe the present inventive concept, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present inventive concept is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, and may optionally be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interactive individual blocks, units, and/or modules without departing from the scope of the inventive concept. In addition, in some embodiments, the block, unit and/or module may be physically combined into more complex blocks, units, and/or modules without departing from the scope of the inventive concept.

The term "connection" between two components may mean that both of an electrical connection and a physical connection are used inclusively, but the present inventive concept is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the present inventive concept.

Meanwhile, the present inventive concept is not limited to the embodiments disclosed below, and may be modified in various forms and may be implemented. In addition, each of the embodiments disclosed below may be implemented alone or in combination with at least one of other embodiments.

FIG. 1 is a diagram illustrating a display device according to an embodiment of the present inventive concept.

Referring to FIG. 1, a display device 100 according to an embodiment of the present inventive concept may include a pixel unit 110 (or display panel), a data driver 120, a gate driver 130, and a timing controller 140. The above-described components may be implemented as a separate integrated circuit, and two or more of the above-described components may be integrated and implemented as one integrated circuit. Also, the gate driver 130 may be formed within the pixel unit 110.

Data lines DL to DLm may be arranged to extend in a first direction DR1. For example, the first direction DR1 may be a direction connecting upper and lower sides of the pixel unit 110 (or the gate driver 130). Alternatively, the first direction DR1 may be a direction connecting left and right sides of the pixel unit 110, or may refer to a different direction.

Scan lines SL1 to SLn may be arranged to extend in a second direction DR2. The second direction DR2 may be a direction perpendicular to the first direction DR1. The second direction DR2 may be a direction connecting the left and right sides of the pixel unit 110 (or gate driver 130). Alternatively, the second direction DR2 may be a direction connecting the upper and lower sides of the pixel unit 110, or may refer to a different direction.

The pixel unit 110 may include pixels PX connected to the scan lines SL1, SL2, . . . , and SLn and the data lines DL1, DL2, . . . , and DLm, where n and m may be natural numbers. As an example, the pixels PX may be arranged in a various known ways.

The pixels PX may be selected in units of horizontal lines when a scan signal is supplied to the scan lines SL1 to SLn (as an example, pixels PX connected to the same scan line may be classified into one horizontal line (or pixel row)). The pixels PX selected by the scan signal may receive a data signal from a data line (any one of DL1 to DLm) connected to them. The pixels PX that receive the data signal may generate light with a predetermined luminance according to a voltage of the data signal.

The data driver 120 may receive output data Dout and a data driving signal DCS from the timing controller 140. The data driving signal DCS may include sampling signals and/or timing signals necessary for driving the data driver 120. The data driver 120 may generate the data signal based on the data driving signal DCS and the output data Dout. As an example, the data driver 120 may generate an analog data signal based on the grayscale of the output data Dout.

The gate driver 130 may receive a scan driving signal SCS from the timing controller 140. The scan driving signal SCS may include at least one scan start signal and clock signals necessary for driving the gate driver 130. The gate driver 130 may generate the scan signal by shifting the scan start signal in response to a clock signal and sequentially supply the scan signal to the scan lines SL1 to SLn.

The gate driver 130 may include a plurality of stages each connected to the scan lines SL1 to SLn. The stages may include shift registers, and each of the stage may supply a scan signal to a scan line (any one of SL1 to SLn) connected to them while shifting the scan start signal.

In an embodiment, the gate driver 130 may be formed together with the pixels PX during a process of forming the pixel unit 110. For example, the gate driver 130 may be an oxide semiconductor thin film transistor gate driver circuit (OSG) type or an amorphous silicon thin film transistor gate driver circuit (ASG) type, and may be formed within the pixel unit 110.

The timing controller 140 may receive input data Din and a control signal CS from a host system through an interface. As an example, the timing controller 140 may receive the input data Din and the control signal CS from at least one of a graphics processing unit (GPU), a central processing unit (CPU), and an application processor (AP) included in the host system. The control signal CS may include various signals including a clock signal.

The timing controller 140 may generate the scan driving signal SCS and the data driving signal DCS based on the control signal CS. The scan driving signal SCS and data driving signal DCS may be supplied to the gate driver 130 and the data driver 120, respectively.

The timing controller 140 may rearrange the input data Din to match the specifications of the display device 100. Also, the timing controller 140 may correct the input data Din to generate the output data Dout and supply the output data Dout to the data driver 120. In an embodiment, the timing controller 140 may correct the input data Din in response to optical measurement results measured during a process.

In an embodiment of the present inventive concept, the display device 100 may include a flat display device, a curved display device in which a portion of the pixel unit 110 is curved, a flexible display device that can be partially folded or bent, and a stretchable display device that can be partially stretched.

In an embodiment of the present inventive concept, the display device 100 may be a device that displays a moving image or a still image, and may include portable electronic devices such as a mobile phone, a smart phone, a tablet personal computer, a smart watch, a watch phone, a mobile communication terminal, an electronic notebook, an e-book, a PMP (Portable Multimedia Player), a navigation, and an UMPC (Ultra Mobile PC). In an embodiment of the present inventive concept, the display device 100 may include electronic devices such as television, a laptop, a monitor, a billboard, and Internet of Things (IoT).

Figure 2:
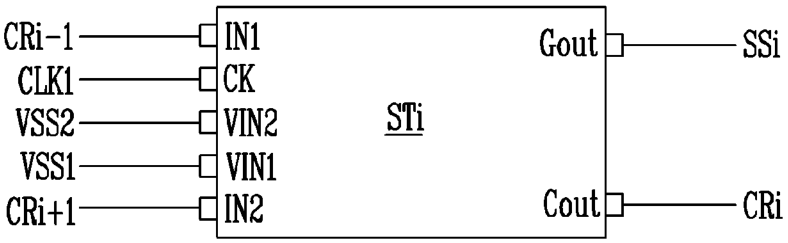
FIG. 2 is a diagram illustrating an embodiment of a stage included in a gate driver.

FIG. 2 is a diagram illustrating an embodiment of a stage included in a gate driver. FIG. 2 shows a stage located on an i-th horizontal line as an example.

Referring to FIG. 2, a stage STi according to an embodiment of the present inventive concept may include a first input terminal IN1, a second input terminal IN2, a first power source input terminal VIN1, a second power source input terminal VIN2, a clock input terminal CK, a first output terminal Gout, and a second output terminal Cout.

The first input terminal IN1 may receive a carry signal CRi−1 (or a start signal STP) (see FIG. 8) of a previous stage. When the carry signal CRi−1 of the previous stage is input to the first input terminal IN1, the stage STi may output a scan signal SSi to the first output terminal Gout and output a carry signal Cri to the second output terminal Cout.

The second input terminal IN2 may receive a carry signal CRi+1 (or an end signal ENP) (see FIG. 8) of the next stage.

When the carry signal CRi+1 of the next stage is input to the second input terminal IN2, the stage STi may stop outputting the scan signal SSi and the carry signal CRi.

Figure 4:
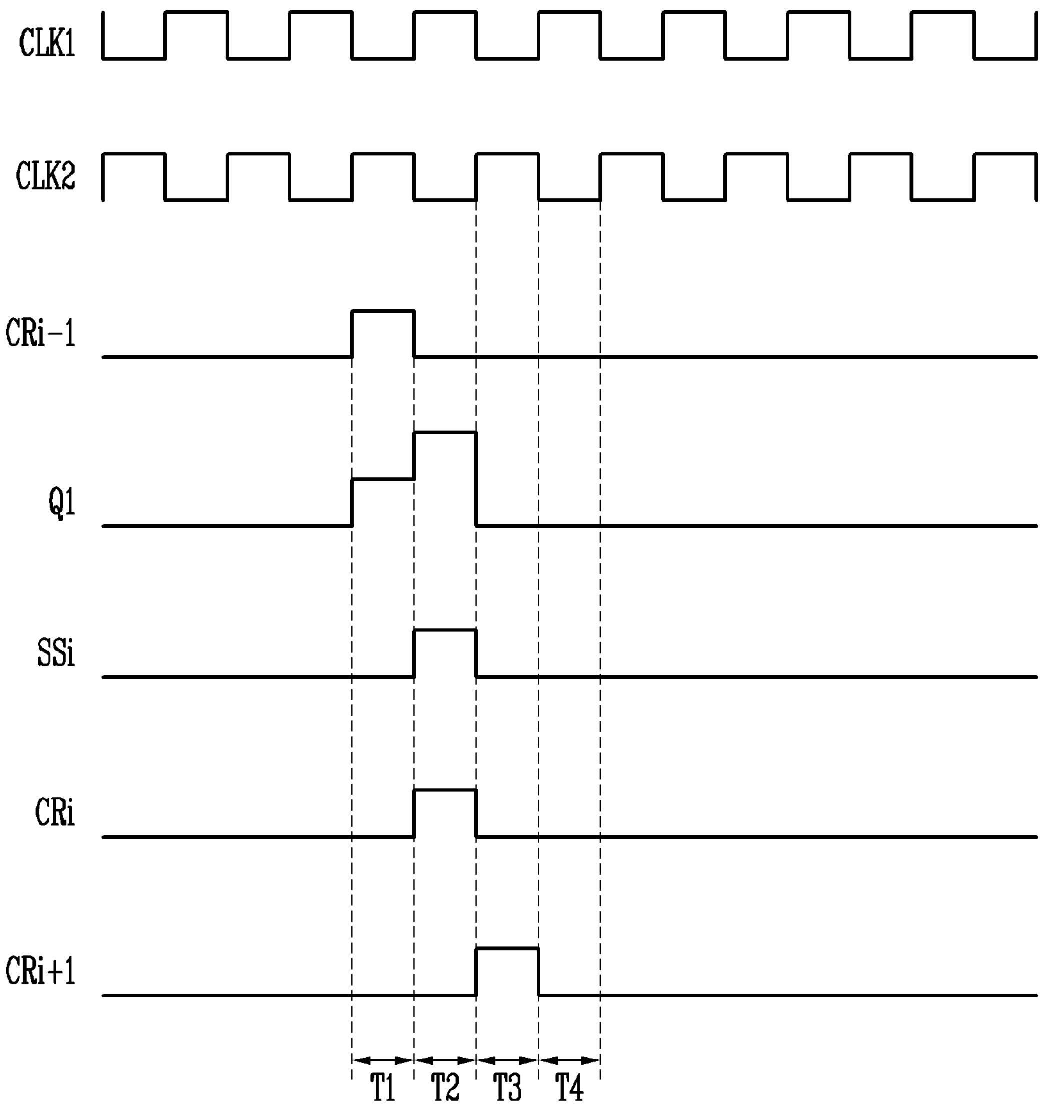
FIG. 4 is a waveform diagram illustrating a method of driving the stage shown in FIG. 3.

The clock input terminal CK may receive a first clock signal CLK1 (or a second clock signal CLK2) (see FIG. 4). As an example, the clock input terminal CK included in an odd-numbered (or even-numbered) stage may receive the first clock signal CLK1, and the clock input terminal CK included in an even-numbered (or odd-numbered) stage may receive the second clock signal CLK2. That is, the first clock signal CLK1 and the second clock signal CLK2 may be alternately input to stages for each horizontal line.

The first power source input terminal VIN1 may receive a voltage of a first power source VSS1. The second power source input terminal VIN2 may receive a voltage of a second power source VSS2. The first power source VSS1 and the second power source VSS2 may have a gate-off voltage. As an example, a transistor that receives the voltage of the first power source VSS1 or the second power source VSS2 through a gate electrode may be set to a turned-off state.

The first output terminal Gout may output the scan signal SSi. The second output terminal Cout may output the carry signal CRi. The carry signal CRi may be supplied to the previous stage and the next stage.

Figure 3:
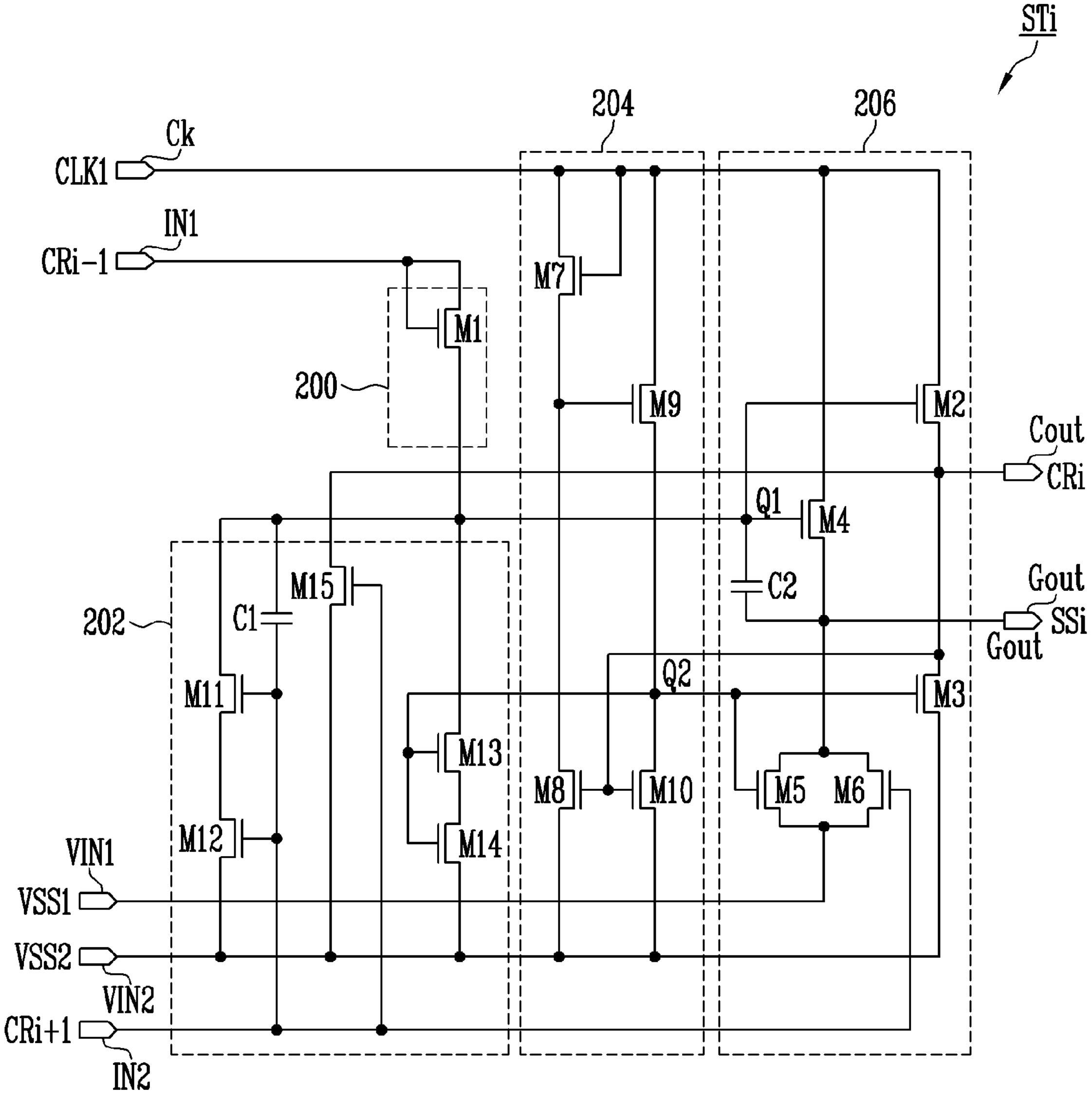
FIG. 3 is a circuit diagram of a stage circuit shown in FIG. 2 according to an embodiment.

FIG. 3 is a circuit diagram of a stage circuit shown in FIG. 2 according to an embodiment.

Referring to FIG. 3, the stage STi according to an embodiment of the present inventive concept may include a pull-up unit 200, a pull-down unit 202, a controller 204, and an output unit 206.

The pull-up unit 200 may control a voltage of a first node Q1 (a Q node) in response to an (i−1)th carry signal CRi−1. For this purpose, the pull-up unit 200 may include a first transistor M1.

A first electrode and gate electrode of the first transistor M1 may be connected to the first input terminal IN1, and a second electrode of the first transistor M1 may be connected to the first node Q1. That is, the first transistor M1 may be connected in the form of a diode and may be turned on when the (i−1)th carry signal CRi−1 is supplied to the first input terminal IN1.

The output unit 206 may output the scan signal SSi through the first output terminal Gout and output the carry signal Cri through the second output terminal Cout in response to voltages of the first node Q1 and a second node Q2 based on the first clock signal CLK1 supplied to the clock input terminal CK. For this purpose, the output unit 206 may include second to sixth transistors M2 to M6 and a second capacitor C2.

A first electrode of the second transistor M2 may be connected to the clock input terminal CK, and a second electrode of the second transistor M2 may be connected to the second output terminal Cout. A gate electrode of the second transistor M2 may be connected to the first node Q1. The second transistor M2 may be turned on and turned off in response to a voltage of the first node Q1 to control the connection between the clock input terminal CK and the second output terminal Cout.

A first electrode of the third transistor M3 may be connected to the second output terminal Cout, and a second electrode of the third transistor M3 may be connected to the second power source input terminal VIN2. A gate electrode of the third transistor M3 may be connected to the second node Q2. The third transistor M3 may be turned on and turned off in response to a voltage of the second node Q2 to control the connection between the second output terminal Cout and the second power source input terminal VIN2.

A first electrode of the fourth transistor M4 may be connected to the clock input terminal CK, and a second electrode of the fourth transistor M4 may be connected to the first output terminal Gout. A gate electrode of the fourth transistor M4 may be connected to the first node Q1. The fourth transistor M4 may be turned on and turned off in response to the voltage of the first node Q1 to control the connection between the clock input terminal CK and the first output terminal Gout.

A first electrode of the fifth transistor M5 may be connected to the first output terminal Gout, and a second electrode of the fifth transistor M5 may be connected to the first power source input terminal VIN1. A gate electrode of the fifth transistor M5 may be connected to the second node Q2. The fifth transistor M5 may be turned on and turned off in response to the voltage of the second node Q2 to control the connection between the first output terminal Gout and the first power source input terminal VIN1.

A first electrode of the sixth transistor M6 may be connected to the first output terminal Gout, and a second electrode of the sixth transistor M6 may be connected to the first power source input terminal VIN1. A gate electrode of the sixth transistor M6 may be connected to the second input terminal IN2. The sixth transistor M6 may be turned on when an (i+1)th carry signal CRi+1 is supplied to electrically connect the first output terminal Cout and the first power source input terminal VIN1.

The second capacitor C2 may be connected between the first node Q1 and the first output terminal Gout. The second capacitor C2 may function as a boosting capacitor. In other words, the second capacitor C2 may increase the voltage of the first node Q1 in response to the voltage increase of the first output terminal Gout when the fourth transistor M4 is turned on. Accordingly, the fourth transistor M4 may stably maintain the turned-on state.

The controller 204 may control the voltage of the second node Q2 in response to the first clock signal CLK1 supplied to the clock input terminal CK. For this purpose, the controller 204 may include seventh to tenth transistors M7 to M10.

A first electrode and gate electrode of the seventh transistor M7 may be connected to the clock input terminal CK, and a second electrode of the seventh transistor M7 may be connected to a first electrode of the eighth transistor M8 and a gate electrode of the ninth transistor M9. The seventh transistor M7 may be connected in the form of a diode and may be turned on when the first clock signal CLK1 is supplied to the clock input terminal CK.

The first electrode of the eighth transistor M8 may be connected to the second electrode of the seventh transistor M7, and a second electrode of the eighth transistor M8 may be connected to the second power source input terminal VIN2. A gate electrode of the eighth transistor M8 may be connected to the second output terminal Cout. The eighth transistor M8 may be turned on when the carry signal CRi is supplied to the second output terminal Cout.

A first electrode of the ninth transistor M9 may be connected to the clock input terminal CK, and a second electrode of the ninth transistor M9 may be connected to the second node Q2. The gate electrode of the ninth transistor M9 may be connected to the second electrode of the seventh transistor M7. The ninth transistor M9 may be turned on and turned off in response to a voltage supplied from the seventh transistor M7 to control the connection between the clock input terminal CK and the second node Q2.

A first electrode of the tenth transistor M10 may be connected to the second node Q2, and a second electrode of the tenth transistor M10 may be connected to the second power source input terminal VIN2. A gate electrode of the tenth transistor M10 may be connected to the second output terminal Cout. The tenth transistor M10 may be turned on when the carry signal CRi is supplied to the second output terminal Cout.

The pull-down unit 202 may control voltages of the first node Q1 and the second output terminal Cout in response to the voltage of the second node Q2 and the (i+1)th carry signal CRi+1 supplied to the second input terminal IN2. For this purpose, the pull-down unit 202 may include eleventh to fifteenth transistors M11 to M15 and a first capacitor C1.

The eleventh transistor M11 and the twelfth transistor M12 may be connected in series between the first node Q1 and the second power source input terminal VIN2. Gate electrodes of the eleventh transistor M11 and the twelfth transistor M12 may be connected to the second input terminal IN2. The eleventh transistor M11 and the twelfth transistor M12 may be turned on when the (i+1)th carry signal CRi+1 is supplied to electrically connect the first node Q1 and the second power source input terminal VIN2. Additionally, since the transistors M11 and M12 are connected in series between the first node Q1 and the second power source input terminal VIN2, a voltage between the first node Q1 and the second power source input terminal VIN2 can be divided, and thus the lifespan characteristics can be improved.

The thirteenth transistor M13 and the fourteenth transistor M14 may be connected in series between the first node Q1 and the second power source input terminal VIN2. Gate electrodes of the thirteenth transistor M13 and the fourteenth transistor M14 may be connected to the second node Q2. The thirteenth transistor M13 and the fourteenth transistor M14 may be turned on and turned off in response to the voltage of the second node Q2 to control the electrical connection between the first node Q1 and the second power source input terminal VIN2. Additionally, since the transistors M13 and M14 are connected in series between the first node Q1 and the second power source input terminal VIN2, the voltage between the first node Q1 and the second power source input terminal VIN2 can be divided, and thus the lifespan characteristics can be improved.

A first electrode of the fifteenth transistor M15 may be connected to the second output terminal Cout, and a second electrode of the fifteenth transistor M15 may be connected to the second power source input terminal VIN2. A gate electrode of the fifteenth transistor M15 may be connected to the second input terminal IN2. The fifteenth transistor M15 may be turned on when the (i+1)th carry signal CRi+1 is supplied to electrically connect the second output terminal Cout and the second power source input terminal VIN2. A first electrode of the first capacitor C1 may be connected to the first node Q1, and a second electrode of the first capacitor C1 may be connected to the second input terminal IN2.

FIG. 4 is a waveform diagram illustrating a method of driving the stage shown in FIG. 3. In the following description, the expression "a clock signal, a carry signal, or the like is supplied" may mean that a gate-on voltage is supplied. Also, the expression "supply of a clock signal, a carry signal, or the like is stopped" may mean that a gate-off voltage is supplied.

Referring to FIG. 4, first, during a first period T1, the (i−1)th carry signal CRi−1 may be supplied to the first input terminal IN1. When the (i−1)th carry signal CRi−1 is supplied, the first transistor M1 may be turned on. When the first transistor M1 is turned on, the (i−1)th carry signal CRi−1 may be supplied to the first node Q1.

When the (i−1)th carry signal CRi−1 is supplied to the first node Q1, the second transistor M2 and the fourth transistor M4 may be turned on. When the second transistor M2 and the fourth transistor M4 are turned on, the first output terminal Gout and the second output terminal Cout may be electrically connected to the clock input terminal CK.

In a second period T2, the first clock signal CLK1 may be supplied to the clock input terminal CK. In this case, since the second transistor M2 and the fourth transistor M4 are set to a turned-on state, the first clock signal CLK1 supplied to the clock input terminal CK may be supplied to the first output terminal Gout and the second output terminal Cout. Here, the first clock signal CLK1 supplied to the first output terminal Gout may be supplied to a scan line as the scan signal SSi. Also, the first clock signal CLK1 supplied to the second output terminal Cout may be supplied to the previous and next stages as an i-th carry signal CRi.

Meanwhile, during the second period T2, the voltage of the first node Q1 may be increased to a voltage higher than that of the first clock signal CLK1 due to boosting of the second capacitor C2. Accordingly, the second transistor M2 and the fourth transistor M4 may be stably maintained in the turned-on state.

In addition, during the second period T2, the eighth transistor M8 and the tenth transistor M10 may be turned on by the i-th carry signal CRi supplied to the second output terminal Cout. When the eighth transistor M8 is turned on, a voltage of the second power source VSS2 may be supplied to the gate electrode of the ninth transistor M9. When the tenth transistor M10 is turned on, the voltage of the second power source VSS2 may be supplied to the second node Q2. Accordingly, during the second period T2, the second node Q2 may be set to the voltage of the second power source VSS2, and accordingly, the third transistor M3 may be maintained in a turned-off state.

Meanwhile, during the second period T2, when the first clock signal CLK1 is supplied to the clock input terminal CK, the seventh transistor M7 may be turned on. Here, the seventh transistor M7 may be connected in the form of a diode. Accordingly, when the seventh transistor M7 and the eighth transistor M8 have similar channel widths, a voltage of the gate electrode of the ninth transistor M9 may be decreased to the voltage of the second power source VSS2. In addition, even if the ninth transistor M9 is turned on, the second node Q2 may maintain the voltage of the second power source VSS2 stably by the tenth transistor M10.

In a third period T3, the (i+1)th carry signal CRi+1 may be supplied to the second input terminal IN2. When the (i+1)th carry signal CRi+1 is supplied to the second input terminal IN2, the sixth transistor M6, the eleventh transistor M11, the twelfth transistor M12, and the fifteenth transistor M15 may be turned on.

When the sixth transistor M6 is turned on, the voltage of the first power source VSS1 from the first power source input terminal VIN1 may be supplied to the first output terminal Gout. When the fifteenth transistor M15 is turned on, the voltage of the second power source VSS2 from the second power source input terminal VIN2 may be supplied to the second output terminal Cout.

When the eleventh transistor M11 and the twelfth transistor M12 are turned on, the voltage of the second power source VSS2 may be supplied to the first node Q1. When the voltage of the second power source VSS2 is supplied to the first node Q1, the second transistor M2 and the fourth transistor M4 may be turned off. In this case, the voltage of the second power source VSS2 may be supplied to the gate electrode of the fourth transistor M4, and the voltage of the first power source VSS1 higher than the voltage of the second power source VSS2 may be supplied to the second electrode of the fourth transistor M4. Accordingly, during the third period T3, the fourth transistor M4 may be set to a completely turned-off state.

In a fourth period T4, the first clock signal CLK1 may be supplied to the clock input terminal CK. When the first clock signal CLK1 is supplied to the clock input terminal CK, the seventh transistor M7 and the ninth transistor M9 may be turned on. When the ninth transistor M9 is turned on, a voltage of the first clock signal CLK1 may be supplied to the second node Q2.

When the first clock signal CLK1 is supplied to the second node Q2, the third transistor M3, the fifth transistor M5, the thirteenth transistor M13, and the fourteenth transistor M14 may be turned on.

When the third transistor M3 is turned on, the voltage of the second power source VSS2 may be supplied to the second output terminal Cout. When the fifth transistor M5 is turned on, the voltage of the first power source VSS1 may be supplied to the first output terminal Gout. When the thirteenth transistor M13 and the fourteenth transistor M14 are turned on, the voltage of the second power source VSS2 may be supplied to the first node Q1. When the voltage of the second power source VSS2 is supplied to the first node Q1, the second transistor M2 and the fourth transistor M4 may be set to a turned-off state.

Substantially, each of the stages according to the present inventive concept may output a scan signal SS and a carry signal CR in response to the first to fourth periods T1 to T4 described above.

Meanwhile, the stage circuit shown in FIGS. 2 and 4 relates to the embodiments of the present inventive concept, and the present inventive concept is not limited thereto. As an example, the present inventive concept is intended to minimize parasitic capacitors caused by signal lines, and may be applied to various known stages that are driven by receiving a carry signal of a previous stage and a carry signal of the next stage.

Figure 5:
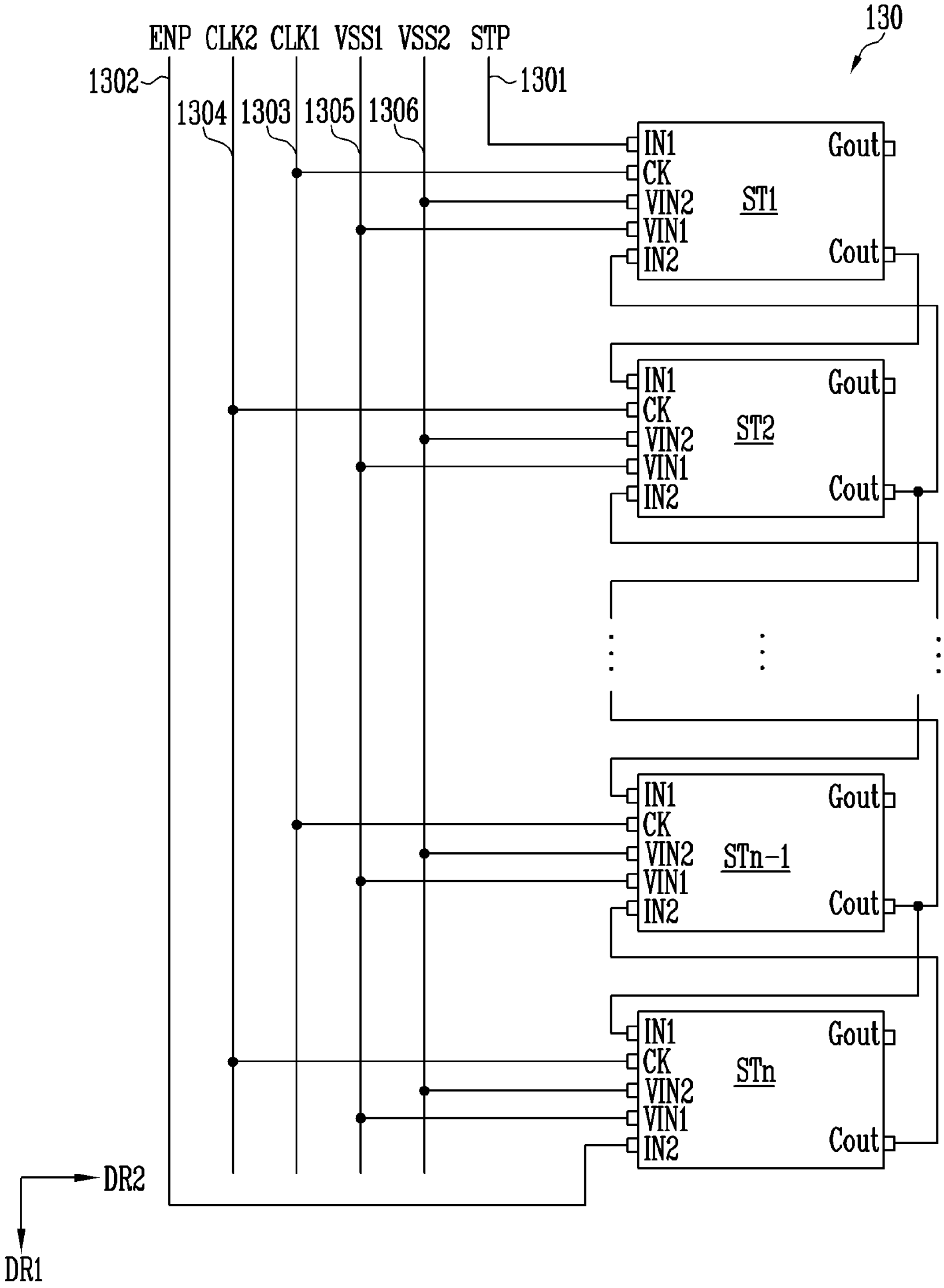
FIG. 5 is a diagram illustrating a gate driver according to an embodiment of the present inventive concept.
Figure 6:
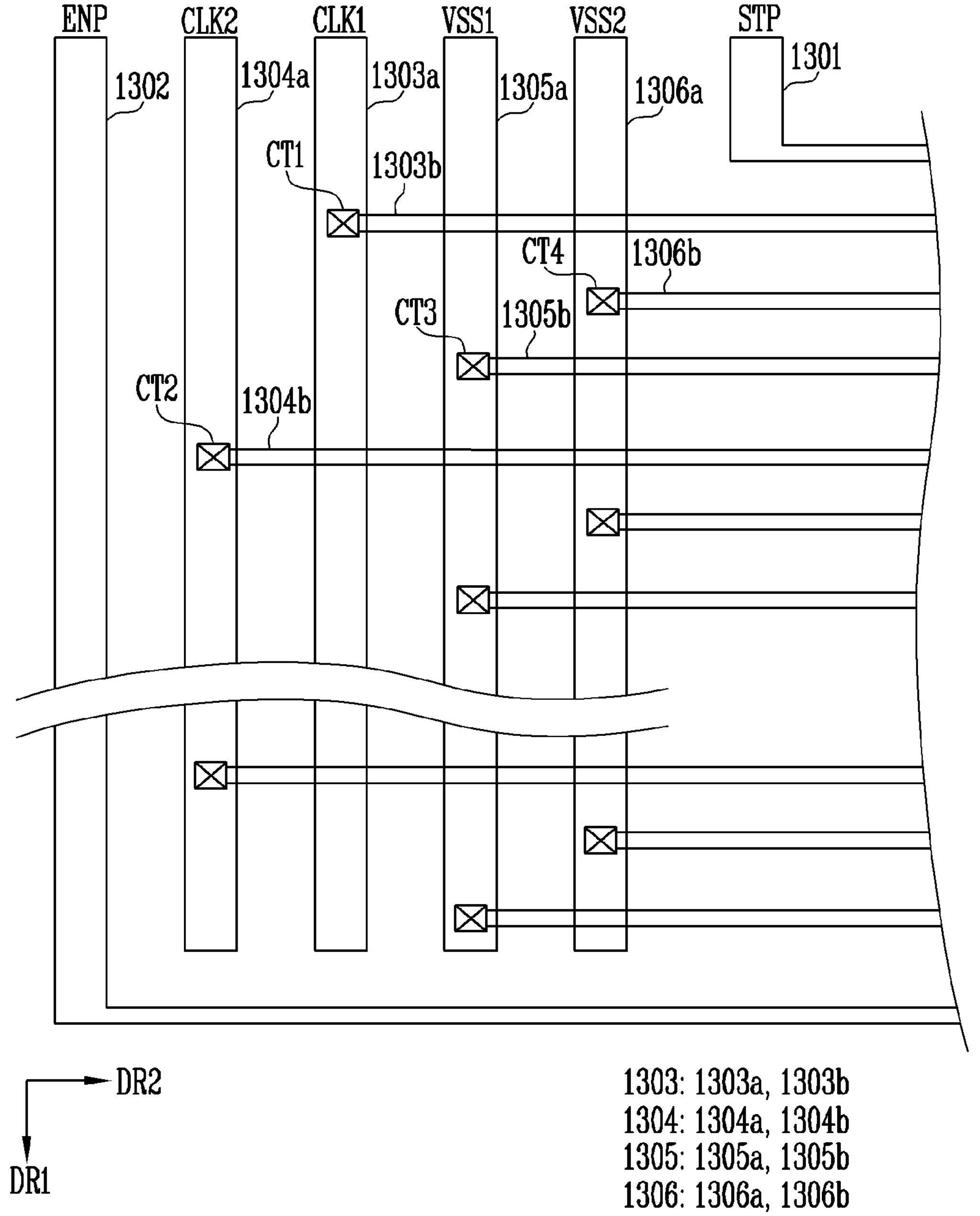
FIG. 6 is a diagram illustrating the connection relationship between signal lines and stages according to an embodiment of the present inventive concept.

FIG. 5 is a diagram illustrating a gate driver according to an embodiment of the present inventive concept. FIG. 6 is a diagram illustrating the connection relationship between signal lines and stages according to an embodiment of the present inventive concept.

Referring to FIGS. 5 and 6, the gate driver 130 according to an embodiment of the present inventive concept may include a plurality of signal lines 1301 to 1306 connected to stages ST1, ST2, . . . , STn−1, and STn.

Each of the stages ST1 to STn may be connected to one of the scan lines SL1 to SLn and may be arranged along the first direction DR1. Here, a first stage ST1 may be located above the gate driver 130 (or above the pixel unit 110), and an n-th stage STn may be located below the gate driver 130 (or below the pixel unit 110). In addition, in each of the stages ST1 to STn, the first input terminal IN1 may be located above the second input terminal IN2.

The first stage ST1 may refer to a stage that supplies the scan signal in response to a start signal STP supplied from a start signal line 1301. The n-th stage STn may refer to a stage in which the supply of the scan signal is stopped by an end signal ENP supplied from an end signal line 1302.

The plurality of signal lines may include the start signal line 1301 for supplying the start signal STP, the end signal line 1302 for supplying the end signal ENP, clock signal lines 1303 and 1304 for supplying clock signals CLK1 and CLK2, and power source signal lines 1305 and 1306 for supplying predetermined power sources.

The start signal line 1301 may be disposed closest to the stages ST1 to STn. As an example, the start signal line 1301 may be disposed closest to the stages ST1 to STn in the second direction DR2. The start signal line 1301 may be connected to the first input terminal IN1 of the first stage ST1. Here, the start signal line 1301 may be disposed closest to the stages ST1 to STn, and thus may not intersect with other signal lines 1302 to 1306.

That is, the start signal line 1301 may not intersect with the other signal lines 1302 to 1306, and may be formed of a single metal layer without a separate contact portion, as shown in FIG. 6. When the start signal line 1301 does not intersect with the other signal lines 1302 to 1306, parasitic capacitance may not be generated or may be minimized between the start signal line 1301 and the other signal lines 1302 to 1306. Accordingly, signal delay, signal interference, or the like can be minimized.

The end signal line 1302 may be disposed furthest from the stages ST1 to STn. As an example, the end signal line 1302 may be disposed furthest from the stages ST1 to STn in the second direction DR2. The end signal line 1302 may be connected to the second input terminal IN2 of the n-th stage STn. Here, the end signal line 1302 may be disposed furthest from the stages ST1 to STn, and thus may not intersect with other signal lines 1301 and 1303 to 1306.

That is, the end signal line 1302 may not intersect with the other signal lines 1301 and 1303 to 1306, and may be formed of a single metal layer without a separate contact portion, as shown in FIG. 6. When the end signal line 1302 does not intersect with the other signal lines 1301 and 1303 to 1306, parasitic capacitance may not be generated or may be minimized between the end signal line 1302 and the other signal lines 1301 and 1303 to 1306. Accordingly, signal delay, signal interference, or the like can be minimized.

The clock signal lines 1303 and 1304 and the power source signal lines 1305 and 1306 may be disposed between the start signal line 1301 and the end signal line 1302 in the second direction. As an example, the clock signal lines 1303 and 1304 and the power source signal lines 1305 and 1306 may be disposed between the start signal line 1301 and the end signal line 1302 in the second direction DR2.

A first clock signal line 1303 may supply the first clock signal CLK1 to stages ST1 and STn−1 located on an odd-numbered (or even-numbered) horizontal line. As an example, the first clock signal line 1303 may be connected to clock input terminals CK of odd-numbered stages ST1 and STn−1. For this purpose, the first clock signal line 1303 may include a first sub-first clock signal line 1303*a* formed of a first metal layer and extending in the first direction DR1, and a second sub-first clock signal line 1303*b* formed of a second metal layer located on a different layer from the first metal layer and extending in the second direction DR2. The first sub-first clock signal line 1303*a* and the second sub-first clock signal line 1303*b* may be electrically connected to each other through a first contact portion CT1.

The second clock signal line 1304 may supply the second clock signal CLK2 to stages ST2 and STn located on an even-numbered (or odd-numbered) horizontal line. As an example, the second clock signal line 1304 may be connected to clock input terminals CK of even-numbered stages ST2 and STn. For this purpose, the second clock signal line 1304 may include a first sub-second clock signal line 1304*a* formed of the first metal layer and extending in the first direction DR1, and a second sub-second clock signal line

**1304*b* formed of the second metal layer and extending in the second direction DR2. The first sub-second clock signal line 1304*a* and the second sub-second clock signal line 1304*b* may be electrically connected to each other through a second contact portion CT2**.

The first power source signal line 1305 may supply the voltage of the first power source VSS1 to the stages ST1 to STn. As an example, the first power source signal line 1305 may be connected to first power source input terminals VIN1 of the stages ST1 to STn. For this purpose, the first power source signal line 1305 may include a first sub-first power source signal line **1305*a* formed of the first metal layer and extending in the first direction DR1, and a second sub-first power source signal line 1305*b* formed of the second metal layer and extending in the second direction DR2. The first sub-first power source signal line 1305*a* and the second sub-first power source signal line 1305*b* may be electrically connected to each other through a third contact portion CT3**.

The second power source signal line 1306 may supply the voltage of the second power source VSS2 to the stages ST1 to STn. As an example, the second power source signal line 1306 may be connected to second power source input terminals VIN2 of the stages ST1 to STn. For this purpose, the second power source signal line 1306 may include a first sub-second power source signal line **1306*a* formed of the first metal layer and extending in the first direction DR1, and a second sub-second power source signal line 1306*b* formed of the second metal layer and extending in the second direction DR2. The first sub-second power source signal line 1306*a* and the second sub-second power source signal line 1306*b* may be electrically connected to each other through a fourth contact portion CT4**.

As described above, according to the embodiments of the present inventive concept, the start signal line 1301 may be disposed closest to the stages ST1 to STn in the second direction, and the end signal line 1302 may be disposed furthest from the stages ST1 to STn in the second direction. Accordingly, the start signal line 1301 and the end signal line 1302 may not intersect with other signal lines 1303 to 1306. Therefore, signal distortion of the start signal and the end signal can be prevented. In addition, the number and type of signal lines 1303 to 1306 disposed between the start signal line 1301 and the end signal line 1302 may vary depending on the type of stage.

In an embodiment, the start signal line 1301 and the end signal line 1302 may be formed of the first metal layer. In another embodiment, the start signal line 1301 and the end signal line 1302 may be formed of the second metal layer. That is, since the start signal line 1301 and the end signal line 1302 do not intersect with the other signal lines 1303 to 1306, the start signal line 1301 and the end signal line 1302 can be formed of the first metal layer and/or the second metal layer, thereby ensuring freedom in design.

Figure 7:
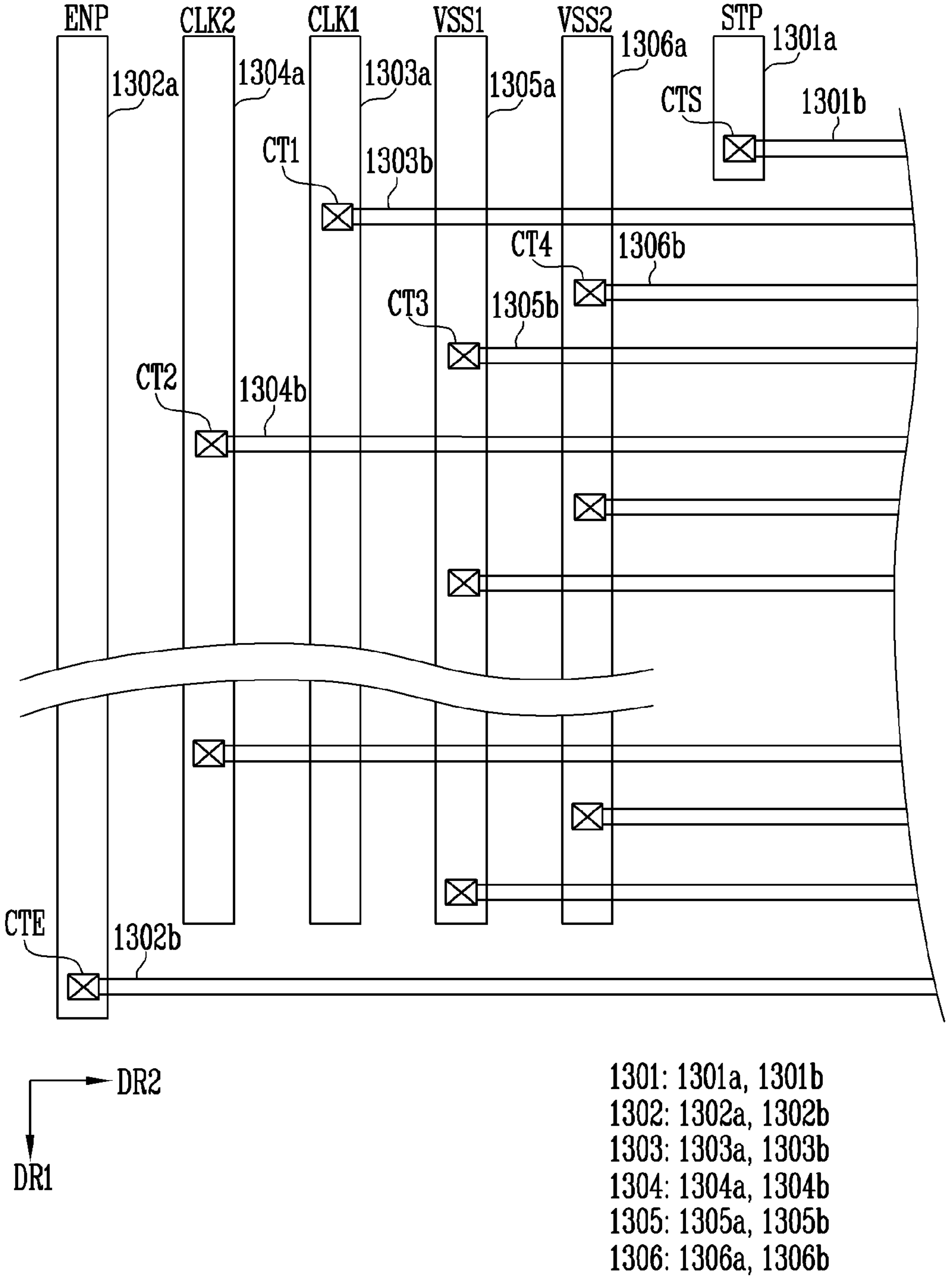
FIG. 7 is a diagram illustrating the connection relationship between signal lines and stages according to an embodiment of the present inventive concept.

FIG. 7 is a diagram illustrating the connection relationship between signal lines and stages according to an embodiment of the present inventive concept. In describing FIG. 7, overlapping descriptions of components that are the same as those in FIG. 6 will be omitted.

Referring to FIG. 7, the gate driver 130 may include the plurality of signal lines 1301 to 1306 connected to the stages ST1, ST2, . . . , STn−1, and STn.

The plurality of signal lines may include the start signal line 1301 for supplying the start signal STP, the end signal line 1302 for supplying the end signal ENP, the clock signal lines 1303 and 1304 for supplying the clock signals CLK1 and CLK2, and the power source signal lines 1305 and 1306 for supplying the predetermined power sources.

The start signal line 1301 may be disposed closest to the stages ST1 to STn. As an example, the start signal line 1301 may be disposed closest to the stages ST1 to STn in the second direction DR2. The start signal line 1301 may be connected to the first input terminal IN1 of the first stage ST1. Here, the start signal line 1301 may be disposed closest to the stages ST1 to STn, and thus may not intersect with other signal lines 1302 to 1306.

In an embodiment, the start signal line 1301 may include a first sub-start signal line **1301*a* formed of the first metal layer and extending in the first direction DR1, and a second sub-start signal line 1301*b* formed of the second metal layer and extending in the second direction DR2. The first sub-start signal line 1301*a* and the second sub-start signal line 1301*b*** may be electrically connected to each other through a contact portion CTS.

The end signal line 1302 may be disposed furthest from the stages ST1 to STn. As an example, the end signal line 1302 may be disposed furthest from the stages ST1 to STn in the second direction DR2. The end signal line 1302 may be connected to the second input terminal IN2 of the n-th stage STn. Here, the end signal line 1302 may be disposed furthest from the stages ST1 to STn, and thus may not intersect with other signal lines 1301 and 1303 to 1306.

In an embodiment, the end signal line 1302 may include a first sub-end signal line **1302*a* formed of the first metal layer and extending in the first direction DR1, and a second sub-end signal line 1302*b* formed of the second metal layer and extending in the second direction DR2. The first sub-end signal line 1302*a* and the second sub-end signal line 1302*b*** may be electrically connected to each other through a contact portion CTE.

Figure 8:
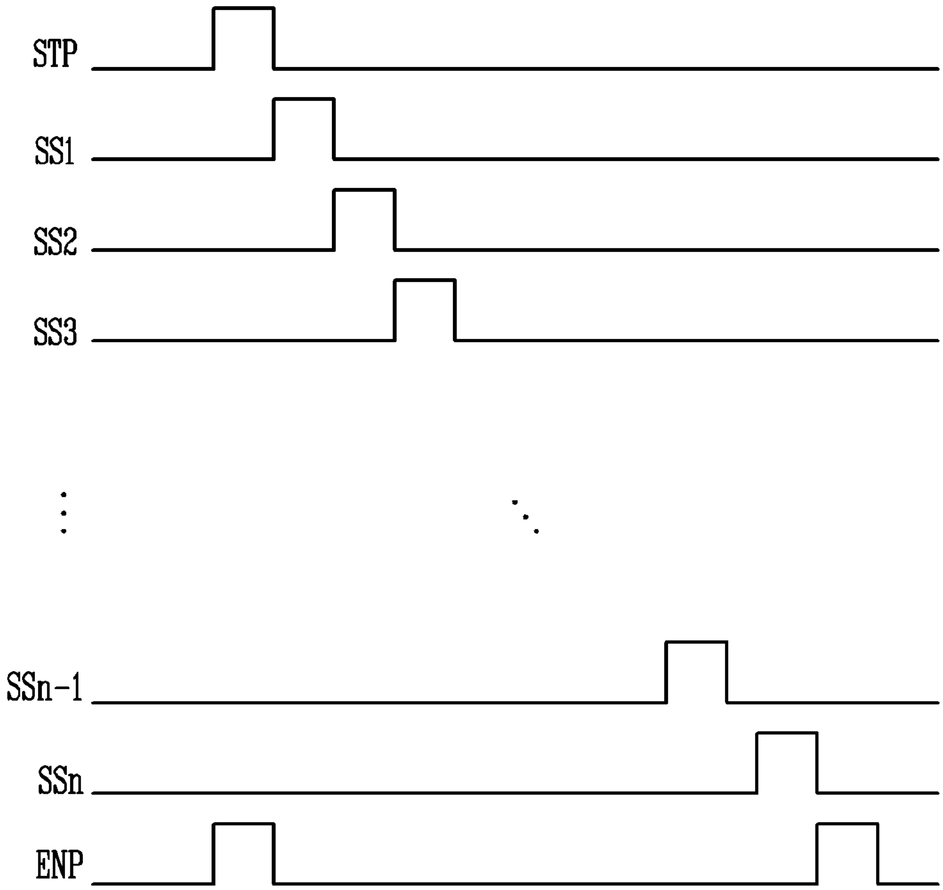
FIG. 8 is a diagram illustrating start and end signals supplied to the gate driver of FIG. 5 and corresponding scan signals.

FIG. 8 is a diagram illustrating start and end signals supplied to the gate driver of FIG. 5 and corresponding scan signals.

Referring to FIG. 8, when the start signal STP is supplied to the first stage ST1, scan signals SS1, SS2, SS3, . . . , SSn−1, and SSn may be sequentially supplied from the stages ST1 to STn to the scan lines SL1 to SLn. After the scan signal SSn is supplied form the last stage STn, the end signal ENP may be supplied. The end signal ENP may be supplied to the second input terminal IN2 of the last stage STn. When the end signal ENP is supplied, the supply of the scan signal from the last stage STn may be stopped.

Meanwhile, in an embodiment of the present inventive concept, the end signal ENP may be additionally supplied to the last stage STn in synchronization with the start signal STP (or so as to at least partially overlap with the start signal STP). In more detail, the gate driver 130 may be set to an off state during a blank period after the scan signal SSn is supplied from the last stage STn. As an example, the clock signals CLK1 and CLK2 may not be supplied to the gate driver 130 during the blank period.

Thereafter, when the gate driver 130 is driven and the end signal ENP is supplied to the last stage STn in synchronization with the start signal STP, the last stage STn may be initialized. In this case, it is possible to prevent ripples or the like from occurring in the last stage STn.

Figure 9:
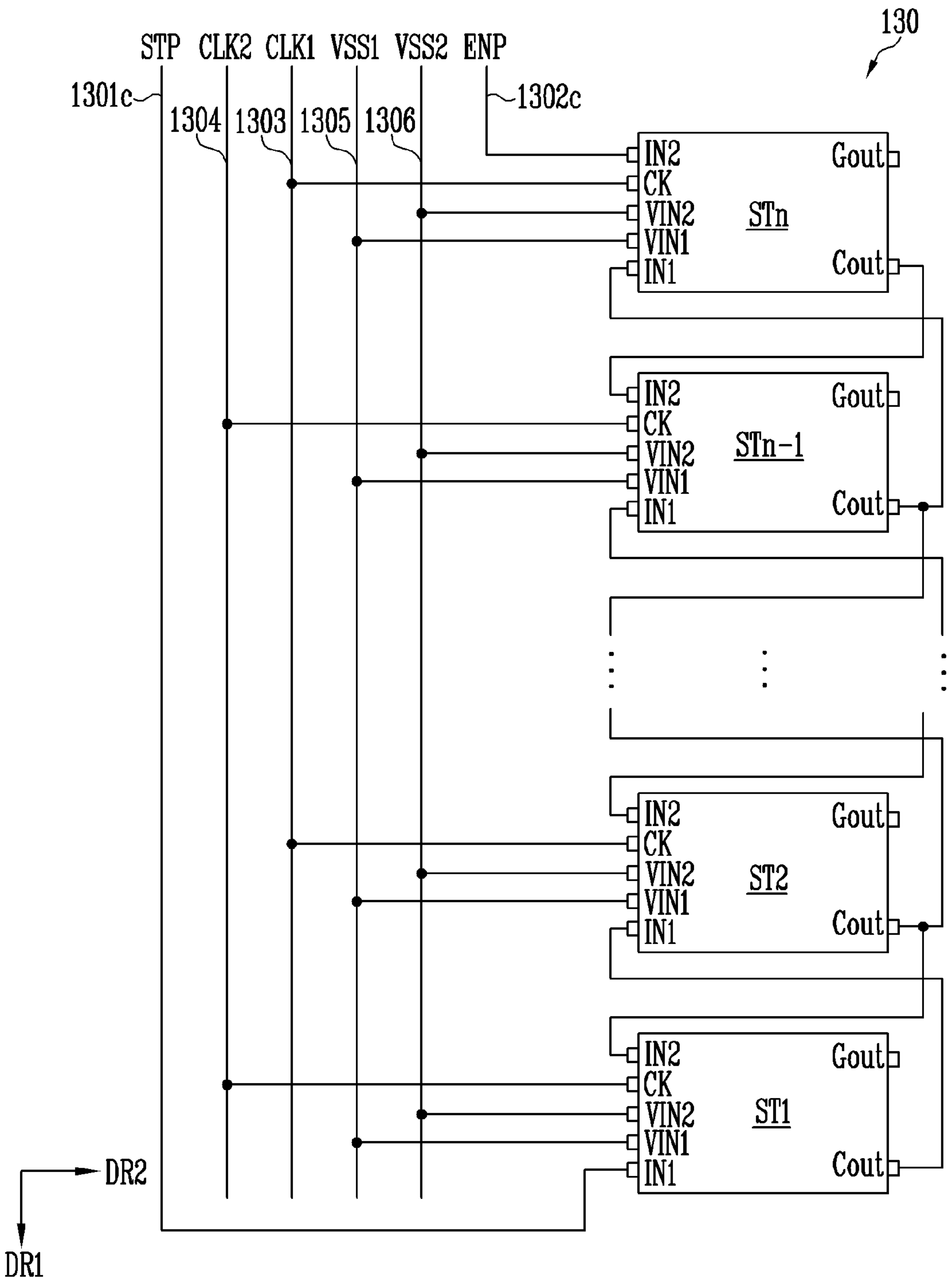
FIG. 9 is a diagram illustrating a gate driver according to an embodiment of the present inventive concept.

FIG. 9 is a diagram illustrating a gate driver according to an embodiment of the present inventive concept. In describing FIG. 9, descriptions overlapping with FIGS. 5 to 7 will be omitted.

Referring to FIG. 9, the gate driver 130 may include a plurality of signal lines **1301*c*, 1302*c*, and 1303 to 1306 connected to the stages ST1, ST2**, . . . , STn−1, and STn.

Each of the stages ST1 to STn may be connected to one of the scan lines SL1 to SLn and may be arranged along the first direction DR1. Here, the first stage ST1 may be located below the gate driver 130 (or below the pixel unit 110), and the n-th stage STn may be located above the gate driver 130 (or above the pixel unit 110). In addition, in each of the stages ST1 to STn, the second input terminal IN2 may be located above the first input terminal IN1.

The first stage ST1 may refer to a stage that supplies the scan signal in response to the start signal STP supplied from a start signal line 1301*c*. The n-th stage STn may refer to a stage in which the supply of the scan signal is stopped by the end signal ENP supplied from an end signal line 1302*c*.

The plurality of signal lines may include the start signal line 1301*c* for supplying the start signal STP, the end signal line 1302*c* for supplying the end signal ENP, the clock signal lines 1303 and 1304 for supplying the clock signals CLK1 and CLK2, and the power source signal lines 1305 and 1306 for supplying the predetermined power sources.

The start signal line 1301*c* may be disposed furthest from the stages ST1 to STn. As an example, the start signal line 1301*c* may be disposed furthest from the stages ST1 to STn in the second direction DR2. The start signal line 1301*c* may be connected to the first input terminal IN1 of the first stage ST1. Here, the start signal line 1301*c* may be disposed furthest from the stages ST1 to STn, and thus may not intersect with other signal lines 1302*c* and 1303 to 1306. When the start signal line 1301*c* does not intersect with the other signal lines 1302*c* and 1303 to 1306, parasitic capacitance may not be generated or may be minimized between the start signal line 1301*c* and the other signal lines 1302*c* and 1303 to 1306. Accordingly, signal delay, signal interference, or the like can be minimized.

The end signal line 1302*c* may be disposed closest to the stages ST1 to STn. As an example, the end signal line 1302*c* may be disposed closest to the stages ST1 to STn in the second direction DR2. The end signal line 1302*c* may be connected to the second input terminal IN2 of the n-th stage STn. Here, the end signal line 1302*c* may be disposed closest to the stages ST1 to STn, and thus may not intersect with other signal lines 1301*c* and 1303 to 1306. When the end signal line 1302*c* does not intersect with the other signal lines 1301*c* and 1303 to 1306, parasitic capacitance may not be generated or may be minimized between the end signal line 1302*c* and the other signal lines 1301*c* and 1303 to 1306. Accordingly, signal delay, signal interference, or the like can be minimized.

The clock signal lines 1303 and 1304 and the power source signal lines 1305 and 1306 may be disposed between the start signal line 1301*c* and the end signal line 1302*c*. As an example, the clock signal lines 1303 and 1304 and the power source signal lines 1305 and 1306 may be disposed between the start signal line 1301*c* and the end signal line 1302*c* in the second direction DR2.

According to the gate driver and the display device including the same according to the embodiments of the present inventive concept, the start signal line supplying the start signal may be disposed closest to or furthest from the stage, and the end signal line supplying the end signal may be disposed furthest from or closest to the stage. Therefore, intersection between signal lines can be minimized, and thus signal distortion can be prevented.

However, effects of the present inventive concept are not limited to the above-described effects, and may be variously extended without departing from the spirit and scope of the present inventive concept.

As described above, preferred embodiments of the present inventive concept have been described with reference to the drawings. However, those skilled in the art will appreciate that various modifications and changes can be made to the present inventive concept without departing from the spirit and scope of the inventive concept as set forth in the appended claims.

What is claimed is:

1. A gate driver comprising:

a plurality of stages arranged in a first direction to output a plurality of scan signals;

clock signal lines supplying a plurality of clock signals to the plurality of stages;

power source signal lines supplying power sources to the plurality of stages, the power source signal lines including a first power source input terminal supplying a first power source having a first gate-off voltage and a second power source input terminal supplying a second power source having a second gate-off voltage;

a start signal line supplying a start signal to a first stage among the plurality of stages; and an end signal line supplying an end signal to a last stage among the plurality of stages, wherein the start signal line does not overlap the end signal line, the clock signal lines and the power source signal lines in a plan view, wherein the end signal line does not overlap the start signal line, the clock signal lines and the power source signal lines in a plan view, wherein the clock signal lines, the first power source input terminal and the second power source input terminal are disposed between the start signal line and the end signal line, and wherein the start signal line, the clock signal lines, the power source signal lines, and the end signal line are disposed in a second direction from the plurality of stages, the second direction being different from the first direction.

2. The gate driver of claim 1, wherein the start signal and the end signal are supplied to the start signal line and the end signal line at a same timing, respectively.

3. The gate driver of claim 2, wherein the end signal is further supplied after a scan signal is supplied to the last stage.

4. The gate driver of claim 1, wherein the first direction is a direction connecting upper and lower sides of the gate driver, and the second direction is a direction connecting left and right sides of the gate driver.

5. The gate driver of claim 1, wherein the first stage is disposed on the upper side of the gate driver, and the last stage is disposed on the lower side of the gate driver, and wherein the start signal line is disposed closest to the plurality of stages in the second direction and the end signal line is disposed furthest from the plurality of stages in the second direction.

6. The gate driver of claim 5, wherein each of the plurality of stages has a first input terminal connected to the start signal line or a carry signal line of a previous stage and a second input terminal connected to the end signal line or a carry signal line of a next stage, and wherein the first input terminal is located above the second input terminal in each of the plurality of stages.

7. The gate driver of claim 1, wherein the first stage is disposed on the lower side of the gate driver and the last stage is disposed on the upper side of the gate driver, and wherein the start signal line is disposed furthest from the plurality of stages in the second direction and the end signal line is disposed closest to the plurality of stages in the second direction.

8. The gate driver of claim 7, wherein each of the plurality of stages has a first input terminal connected to the start signal line or a carry signal line of a previous stage and a second input terminal connected to the end signal line or a carry signal line of a next stage, and wherein the first input terminal is located below the second input terminal in each of the plurality of stages.

9. The gate driver of claim 1, wherein each of the clock signal lines and the power source signal lines includes a first metal layer extending in the first direction and a second metal layer extending in the second direction, and wherein the second metal layer is located in a different layer from the first metal layer.

10. The gate driver of claim 9, wherein the start signal line and the end signal line are formed of the first metal layer.

11. The gate driver of claim 9, wherein the start signal line and the end signal line are formed of the second metal layer.

12. A display device comprising:

a pixel unit including pixels connected to scan lines and data lines;

a data driver supplying data signals to the data lines; and a gate driver including stages outputting scan signals to the scan lines, and signal lines connected to the stages, wherein the stages are arranged in a first direction, wherein the signal lines include:

clock signal lines supplying clock signals to the stages;

power source signal lines supplying power sources to the stages, the power source signal lines including a first power source input terminal supplying a first power source having a first gate-off voltage and a second power source input terminal supplying a second power source having a second gate-off voltage;

a start signal line supplying a start signal to a first stage among the stages; and an end signal line supplying an end signal to a last stage among the stages, wherein the start signal line does not overlap the end signal line, the clock signal lines and the power source signal lines in a plan view, wherein the end signal line does not overlap the start signal line, the clock signal lines and the power source signal lines in a plan view, wherein the clock signal lines and, the first power source input terminal and the second power source input terminal are disposed between the start signal line and the end signal line, and wherein the start signal line, the clock signal lines, the power source signal lines, and the end signal line are disposed in a second direction from the plurality of stages, the second direction being different from the first direction.

13. The display device of claim 12, wherein when the start signal is supplied to the start signal line, the end signal is supplied to the end signal line.

14. The display device of claim 13, wherein the end signal is further supplied to the end signal line after a scan signal is supplied to the last stage.

15. The display device of claim 12, wherein the first stage is disposed on the upper side of the pixel unit and the last stage is disposed on the lower side of the pixel unit, and wherein the start signal line is disposed closest to the stages and the end signal line is disposed furthest from the stages.

16. The display device of claim 15, wherein each of the stages has a first input terminal connected to the start signal line or a carry signal line of a previous stage and a second input terminal connected to the end signal line or a carry signal line of a next stage, and wherein the first input terminal is located above the second input terminal in each of the stages.

17. The display device of claim 12, wherein the first stage is disposed on the lower side of the pixel unit and the last stage is disposed on the upper side of the pixel unit, and wherein the start signal line is disposed furthest from the stages and the end signal line is disposed closest to the stages.

18. The display device of claim 17, wherein each of the stages has a first input terminal connected to the start signal line or a carry signal line of a previous stage and a second input terminal connected to the end signal line or a carry signal line of a next stage, and wherein the first input terminal is located below the second input terminal in each of the stages.

* * * * *